US006981762B2

(12) United States Patent
Mashita et al.

(10) Patent No.: US 6,981,762 B2
(45) Date of Patent: Jan. 3, 2006

(54) ELASTIC MEMBERS FOR INKJET RECORDING APPARATUS INK TANKS AND INKJET RECORDING APPARATUS

(75) Inventors: Naruhiko Mashita, Kanagawa (JP); Youkou Saito, Kanagawa (JP); Tadashi Utsunomiya, Kanagawa (JP); Yasunori Fukuda, Kanagawa (JP); Jun Arai, Kanagawa (JP); Shoson Shibata, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 173 days.

(21) Appl. No.: 10/470,535

(22) PCT Filed: Jan. 31, 2002

(86) PCT No.: PCT/JP02/00772

§ 371 (c)(1),
(2), (4) Date: Nov. 10, 2003

(87) PCT Pub. No.: WO02/060697

PCT Pub. Date: Aug. 8, 2002

(65) Prior Publication Data

US 2004/0070653 A1 Apr. 15, 2004

(30) Foreign Application Priority Data

| Jan. 31, 2001 | (JP) | ............................. | 2001-022868 |
| Jan. 31, 2001 | (JP) | ............................. | 2001-022869 |
| Apr. 2, 2001 | (JP) | ............................. | 2001-103115 |

(51) Int. Cl.
*B41J 2/175* (2006.01)

(52) U.S. Cl. ...................................................... 347/86
(58) Field of Classification Search ................. 347/86, 347/87, 85, 84, 29, 31, 33; 399/102, 103, 399/105–106; 525/88, 92 F, 93–99, 263, 525/314
See application file for complete search history.

(56) References Cited

U.S. PATENT DOCUMENTS

| 4,677,447 A | 6/1987 | Nielsen |
| 5,956,053 A | 9/1999 | Michael |
| 6,000,789 A | 12/1999 | Takagi et al. |
| 6,130,696 A * | 10/2000 | Mashita et al. ............... 347/86 |
| 6,383,436 B1 * | 5/2002 | Nishimuro et al. ......... 264/245 |
| 6,743,860 B2 * | 6/2004 | Mizuno ....................... 525/88 |
| 6,871,944 B2 * | 3/2005 | Kobayashi et al. ........... 347/86 |

FOREIGN PATENT DOCUMENTS

| EP | 0 709 207 A2 | 5/1996 |
| EP | 0 841 174 A2 | 5/1998 |
| EP | 0 879 702 A2 | 11/1998 |
| EP | 0 919 384 A2 | 6/1999 |
| JP | 63057662 A | 3/1988 |
| JP | 63057663 A | 3/1988 |
| JP | 09030009 A | 2/1997 |
| JP | 11050044 A | 2/1999 |
| JP | 2000079697 A | 3/2000 |
| JP | 2000-230167 A | 8/2000 |
| JP | 2000301706 A | 10/2000 |
| JP | 2000355158 A | 12/2000 |

* cited by examiner

Primary Examiner—K. Feggins
(74) Attorney, Agent, or Firm—Sughrue Mion, PLLC

(57) ABSTRACT

The elastic member for an ink jet recording apparatus according to the present invention is formed from:
(1) a thermoplastic elastomer composition comprising 100 parts by weight of (a) a hydrogenated block copolymer, 60 to 170 parts by weight of (b) a softening agent for a non-aromatic rubber and 5 to 30 parts by weight of (c) polypropylene,
(2) a thermoplastic elastomer composition in which a network structure having a pore diameter of 50 μm or less is formed, comprising 100 parts by weight of (a) a hydrogenated block copolymer, 60 to 170 parts by weight of (b) a softening agent for a non-aromatic rubber and 5 to 30 parts by weight of (c) crystalline polyolefin, or
(3) a thermoplastic elastomer composition in which a shear rate dependency of a melt viscosity measured by means of a capillograph is −1.5 to −0.8, comprising 100 parts by weight of (a) a hydrogenated block copolymer, 60 to 170 parts by weight of (b) a softening agent for a non-aromatic rubber and 5 to 30 parts by weight of (c) crystalline polyolefin. The elastic member of the present invention is used as an ink tank valve, a sealing member for an ink tank and a sealing member for preventing an ink from leaking from a recording head.

27 Claims, No Drawings

ELASTIC MEMBERS FOR INKJET RECORDING APPARATUS INK TANKS AND INKJET RECORDING APPARATUS

BACKGROUND OF THE INVENTION

The present invention relates to an elastic member for an ink jet recording apparatus, an ink tank and an ink jet recording apparatus, more specifically to an elastic member which is used as a sealing member for an ink tank valve and an ink tank in an ink tank used in an ink jet recording apparatus feeding a recording head with an ink to record printed letters on a printing medium, which is used as a sealing member for preventing an ink from leaking from a recording head in an ink jet recording apparatus body, which can be injection-molded by a two-color molding method and which comprises a material having an excellent durability, an ink tank using the same and an ink jet recording apparatus.

RELATED ART

In an ink jet recording apparatus, an ink room filled with an ink and an ink feeding part for feeding an ink are installed. The form of this ink tank includes, for example, one which is structured so that a recording head fixedly mounted to a carriage is fed with an ink via a tube arranged in the apparatus and which is freely detachable to the apparatus and one which is structured integrally with a recording head and which is freely detachable to a carriage.

In the former ink tank, taken is the configuration of feeding an ink by providing a head difference to the recording head. On the other hand, taken in the latter is the configuration of feeding the recording head with an ink by providing a negative pressure-producing source at an ink tank side.

In recent years, a lot of apparatuses employing the ink tank of the latter configuration are proposed from the viewpoint of a reduction in a size of an apparatus and an easiness in maintenance.

It is required to such ink tank that an ink corresponding to an ink amount discharged from a recording head in recording can be fed well and that an ink does not leak in non-recording.

An ink tank satisfying such requirement includes, for example, a cartridge in which a recording head is integrated with an ink tank, which is freely detachable to a carriage and in which the ink tank is filled with an absorber (foamed matter). Thus, a stable meniscus of an ink can be maintained at a discharging part of the ink by filling the ink tank with the absorber, and the ink is held in the ink tank by virtue of a capillary force of this absorber. In this case, almost the whole of the ink tank has to be filled with the absorber, and an ink amount which is a little smaller than an ink amount capable of being held in the absorber at maximum is held in the absorber, whereby an internal negative pressure is produced making use of a capillary force. Accordingly, even when mechanical shock such as vibration and heat shock such as temperature change are given to a recording head and an ink tank, less ink leaks from a discharge part of the recording head and an air communicating part of the ink tank, and the ink can stably be held.

However, a system in which the whole part of the ink tank is filled with the absorber has the problem that a negative pressure of the absorber is increased as the ink is consumed and that the large ink amount remains in the ink tank without being fed to the recording head, so that the use efficiency is inferior.

In order to solve such problem, proposed is, for example, an ink cartridge for an ink jet recording head which is constituted so that an ink tank is separated into an ink reservoir and a cavity by a wall having a passage in a lower part of the ink tank and an umbrella check valve is movably provided in this passage and that the valve is opened when a recording head is reduced in an ink pressure and an ink stored in the ink reservoir is discharged into the cavity and fed to the recording head (Japanese Patent Application Laid-Open No. 231759/1987).

According to this, an absorber does not have to be provide in a cartridge, and therefore it becomes possible to increase a substantial ink receiving amount in a tank. In general, however, an umbrella check valve has a too large offset amount to precisely control feeding of an ink to a recording head, and there is the large problem that the ink feeding amount fluctuates to bring about a reduction in a printing quality.

On the other hand, an ink reservoir is completely intercepted from a recording head in the state that an umbrella check valve is closed, and therefore when an ink in a cavity is expanded in a volume by 2 to 5% by a change in an ambient temperature, there is the problem that the cavity is increased in a pressure to break a seal in a connecting port to the recording head and that the ink leaks. On the other hand, in the state that it is installed in the recording head, this pressure is exerted directly on the recording head, and a negative pressure can not be maintained between the recording head and the ink tank to bring about the problem that the ink leaks from the recording head.

Further, in this umbrella check valve, a pressure difference of several ten mm water column which has to be maintained in order to stably feed the ink to the recording head is weak for a valve closing force, and therefore the valve is likely to be opened responding to rocking of the ink caused by moving of a carriage to bring about the problem that stability in printing is inferior.

Accordingly, in order to solve the problems originating in the ink tank equipped with the umbrella check valve, it is tried to use an ink tank valve which is disposed in a position separating an ink room from an ink feeding part and moves by a pressure difference between the above ink room and the ink feeding part to feed a recording head part with an ink filled in the ink room (Japanese Patent Application Laid-Open No. 174860/1996).

Installation of such ink tank valve makes it possible to surely respond to a minute pressure difference from the recording head, to maintain a negative pressure suited to printing with the recording head without being affected by rocking of an ink caused by moving of a carriage to surely feed the recording head with the ink and to prevent the ink from leaking from an ink feeding port and the recording head due to a temperature change.

In this ink tank valve, an elastic material is usually used, and a material obtained by adhering an elastic material on a plastic base material is used. In general, a thermosetting rubber has so far been used for this elastic material. However, there have been the problems that it is difficult to injection-mold this thermosetting rubber by a two-color molding method with a plastic and a production cost for preparing the valve described above is increased and that it is difficult to mold a member having a desired shape from a material reduced in a hardness and vulcanize it.

On the other hand, a foamed elastic member of polyurethane foam has so far been fitted to an ink feeding port in an exchangeable ink tank to thereby prevent an ink from leaking, but the ink can not be held in a certain case after used over a long period of time, and an elastic member having an excellent durability has been desired.

In an ink jet recording apparatus, a recording head is allowed to stand by at the end of the ink jet recording apparatus body when the recording apparatus is not operated, and in such standing by, the recording head is received on a sealing member arranged along a concave part disposed in the ink jet recording apparatus body described above in order to prevent an ink from leaking the recording head. Usually, a thermosetting rubber is used for this member, and this thermosetting rubber has had the same problem as described above.

Further, in recent years, as the performances of a color ink jet printer become higher (a print performance: 360 dpi×360 dpi (dots/inch) or more and multicolored), precise printing of desired colors and an excellent durability in an ink comprising water, a coloring matter and a surfactant are required to members for an ink jet recording apparatus.

DISCLOSURE OF THE INVENTION

Under such situation, a first object of the present invention is to provide an elastic member for an ink jet recording apparatus comprising a thermoplastic elastomer composition which can be injection-molded by a two-color molding method with a plastic, which can be molded from a material reduced in a hardness and vulcanized, which has a good solvent resistance and is excellent in durability and which has less oil bleeding into an ink.

A second object of the present invention is to provide an elastic member suitably used as an ink tank valve which is disposed particularly in a position separating an ink room from an ink feeding part in an ink jet recording apparatus and which moves by virtue of a pressure difference between the above ink room and the ink feeding part to feed a recording head part with an ink filled in the ink room.

A third object of the present invention is to provide an elastic member suitably used as a sealing member which is disposed in an ink feeding port in an ink jet recording apparatus and which prevents an ink from leaking from the above ink feeding port.

A fourth object of the present invention is to provide an elastic member suitably used as a sealing member which is disposed in an ink jet recording apparatus body and which prevents an ink from leaking from a recording head and prevents the recording head from drying.

A fifth object of the present invention is to provide an ink tank using this elastic member and an ink jet recording apparatus.

Intensive researches repeated by the present inventors in order to achieve the objects described above have resulted in finding that the objects can be achieved by an elastic member which is constituted from a thermoplastic elastomer composition comprising a specific hydrogenated block copolymer, a specific softening agent for a non-aromatic rubber and polypropylene.

The present inventors have further found that the objects can be achieved by an elastic member which is obtained by rapidly cooling, solidifying and molding a thermoplastic elastomer composition comprising a specific hydrogenated block copolymer, a specific softening agent for a non-aromatic rubber and crystalline polypropylene.

The present inventors have further found that the objects can be achieved by an elastic member which is constituted from a thermoplastic elastomer composition which comprises a specific hydrogenated block copolymer, a specific softening agent for a non-aromatic rubber and crystalline polyolefin and in which a shear dependency of a melt viscosity falls in a specific range.

The present invention has been completed based on such findings.

That is, the present invention provides an elastic member used for an ink jet recording apparatus in which an ink is fed to record printed letters on a recording medium, characterized by being constituted from a thermoplastic elastomer composition comprising:

(a) 100 parts by weight of a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound, wherein the hydrogenated block copolymer has a weight average molecular weight of 200,000 or more measured by gel permeation chromatography (GPC), (b) 60 to 170 parts by weight of a softening agent for a non-aromatic rubber which has a dynamic viscosity of 350 to 400 $mm^2$/sec at 40° C. and in which a ratio (Mw/Mn) of a weight average molecular weight to a number average molecular weight each measured by gel permeation chromatography (GPC) is 1.8 or less and (c) 5 to 30 parts by weight of polypropylene.

Further, the present invention provides an elastic member used for an ink jet recording apparatus in which an ink is fed to record printed letters on a recording medium, characterized by being constituted from a thermoplastic elastomer composition in which a network structure having a pore diameter of 50 μm or less is formed, comprising:

(a) 100 parts by weight of a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound, wherein the hydrogenated block copolymer has a weight average molecular weight of 200,000 or more measured by gel permeation chromatography (GPC), (b) 60 to 170 parts by weight of a softening agent for a non-aromatic rubber having a dynamic viscosity of 300 to 500 $mm^2$/sec at 40° C. and (c) 5 to 30 parts by weight of crystalline polyolefin.

Further, the present invention provides an elastic member used for an ink jet recording apparatus in which an ink is fed to record printed letters on a recording medium, characterized by being constituted from a thermoplastic elastomer composition in which a shear rate dependency of a melt viscosity measured by means of a capillograph is −1.5 to −0.8, comprising:

(a) 100 parts by weight of a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound, wherein the hydrogenated block copolymer has a weight average molecular weight of 200,000 or more measured by gel permeation chromatography (GPC), (b) 60 to 170 parts by weight of a softening agent for a non-aromatic rubber having a dynamic viscosity of 300 to 500 mm$^2$/sec at 40° C. and (c) 5 to 30 parts by weight of crystalline polyolefin.

Also, the present invention provides an ink tank comprising an ink room filled with an ink and an ink feeding part for feeding a recording head part with the ink, wherein the respective elastic members described above are used.

Further, the present invention provides an ink jet recording apparatus characterized by using the respective elastic members described above.

BEST MODE FOR CARRYING OUT THE INVENTION (A) First Thermoplastic Elastomer Composition The first thermoplastic elastomer composition constituting the elastic member of the present invention comprises (a) the hydrogenated block copolymer, (b) the softening agent for a non-aromatic rubber and (c) polypropylene as essential components. Used as the component (a) is a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound.

The block copolymer described above includes, for example, styrene-butadiene-styrene block copolymers and styrene-isoprene-styrene block copolymers. The hydrogenated block copolymer obtained by hydrogenating such block copolymer includes, for example, triblock copolymers (SEBS) of styrene-ethylene/butylene-styrene and triblock copolymers (SEPS) of styrene-ethylene/propylene-styrene. These hydrogenated block copolymers are used mainly alone but may be used in a blend of two or more kinds thereof.

The hydrogenated block copolymer of the component (a) has to have a weight average molecular weight of 200,000 or more measured by gel permeation chromatography (GPC). If this weight average molecular weight is less than 200,000, a problem in terms of durability is brought about when the thermoplastic elastomer composition according to the present invention is used as the elastic member for an ink tank. An upper limit of this weight average molecular weight shall not specifically be restricted, and it is usually about 400,000.

In the first thermoplastic elastomer composition used for the elastic member of the present invention, the softening agent (b) for a non-aromatic rubber which has a dynamic viscosity of 350 to 400 mm$^2$/sec at 40° C. and in which a ratio (Mw/Mn) of a weight average molecular weight to a number average molecular weight each measured by gel permeation chromatography (GPC) is 1.8 or less is blended for the purpose of reducing a hardness of the hydrogenated block copolymer described above. If the dynamic viscosity is less than 350 mm$^2$/sec at 40° C. in this softening agent, brought about is the inconvenience that oil bleeding from oxide is notably increased. On the other hand, if it exceeds 400 mm$^2$/sec, the inconvenience that the rubber is less liable to be mixed is brought about.

If Mw/Mn in this softening agent exceeds 1.8, the problem that the softening agent is liable to bleed. This Mw/Mn is preferably 1.0 to 1.5. This softening agent has preferably a weight average molecular weight of less than 20000, particularly 10000 or less and especially 5000 or less.

Usually, a compound which is liquid at room temperature is used as such softening agent. The softening agent having such property can suitably be selected from, for example, mineral oil base and synthetic base softening agents for various rubbers or resins. In this case, the mineral oil base softening agents include process oils of a naphthene base and a paraffin base.

Among them, preferred is a compound which is at least one selected from non-aromatic oils, particularly paraffin base oils of a mineral oil series, naphthene base oils and polyisobutylene base oils of a synthetic base and which has a weight average molecular weight of 450 to 5000.

These softening agents may be used alone or in a mixture of two or more kinds thereof if they have a good mutual compatibility.

A blend amount of these softening agents is 60 to 170 parts by weight, preferably 70 to 160 parts by weight and more preferably 100 to 160 parts by weight per 100 parts by weight of the hydrogenated block copolymer of the component (a). If this amount is less than 60 parts by weight, a satisfactory reduction in the hardness can not be achieved, and the thermoplastic elastomer composition is likely to have an unsatisfactory flexibility. On the other hand, if it exceeds 170 parts by weight, the softening agent is liable to bleed, and it causes a reduction of a mechanical strength of the thermoplastic elastomer composition. Preferably, this blend amount of the softening agent is suitably selected in the range described above according to the molecular weight of the hydrogenated block copolymer described above and the kind of the other components added to the above hydrogenated block copolymer A blend amount of polypropylene of the component (c) is 5 to 30 parts by weight, preferably 5 to 20 parts by weight and more preferably 10 to 15 parts by weight per 100 parts by weight of the hydrogenated block copolymer of the component (a). If a blend amount of polypropylene is less than 5 parts by weight, brought about is the inconvenience that the extrusion molding property and the injection molding property are deteriorated. On the other hand, if it exceeds 30 parts by weight, the inconvenience that the composition is hardened and can not reveal flexibility.

The thermoplastic elastomer composition according to the present invention can be blended, if desired, with a polyphenylene ether resin for the purpose of improving a compression set of the composition. The polyphenylene ether resin used here is a homopolymer comprising a repetitive unit represented by the following formula or a copolymer containing the above repetitive unit:

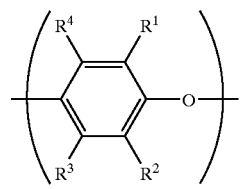

wherein $R^1$, $R^2$, $R^3$ and $R^4$ each represent independently a hydrogen atom, a halogen atom or a hydrocarbon group.

Publicly known resins can be used for this polyphenylene ether resin. To be specific, it includes poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether) and poly(2,6-dichloro-1,4-phenylene ether). Further, capable of being used are polyphenylene ether copolymers such as copolymers of 2,6-dimethylphenol with monovalent phenols (for example, 2,3,6-trimethylphenol and 2-methyl-6-butylphenol). Among them, preferred are poly(2,6-dimethyl-1,4-phenylene ether) and copolymers of 2,6 -dimethylphenol with 2,3,6-trimethylphenol, and poly(2,6-dimethyl-1,4-phenylene ether) is further preferred.

A blend amount of the polyphenylene ether resin can suitable be selected in a range of 10 to 250 parts by weight per 100 parts by weight of the thermoplastic elastomer composition. If this blend amount exceeds 250 parts by weight, a hardness of the thermoplastic elastomer composition is likely to be raised, and therefore it is not preferred. It is blended preferably in an amount of 10 parts by weight or more in order to obtain a satisfactory improving effect of the compression set.

The thermoplastic elastomer composition according to the present invention can be blended with scaly inorganic additives such as clay, diatomaceous earth, silica, talc, barium sulfate, calcium carbonate, magnesium carbonate, metal oxides, mica, graphite and aluminum hydroxide, particulate or powdery solid fillers such as various kinds of metal powders, wood chips, glass powder, ceramics powder and particulate or powdery polymers and other various natural or artificial short fibers and long fibers (for example, straw, hair, glass fiber, metal fiber and other various polymer fibers).

The weight can be reduced by blending hollow fillers, for example, inorganic hollow fillers such as glass balloon and silica balloon and organic hollow fillers comprising polyvinylidene fluoride and polyvinylidene fluoride copolymers. Further, various foaming agents can be mixed in order to improve various physical properties such as a reduction in weight, and gas can mechanically be mixed in blending.

In the thermoplastic elastomer composition according to the present invention, additives such as publicly known resin components in addition to the components described above can be used in combination in order to improve various characteristics.

Polyolefin resins other than polypropylene and polystyrene resins can be used alone or in combination as the resin component. Addition thereof makes it possible to elevate a processability and a heat resistance of the thermoplastic elastomer composition according to the present invention. The polyolefin resins other than polypropylene include, for example, copolymers of ethylene and propylene with a small amount of α-olefins (for example, propylene-ethylene copolymers, propylene/4-methyl-1-pentene copolymers), poly(4-methyl-1-pentene) and polybutene-1. When copolymers of isotactic polypropylene are used as the polyolefin resin, the copolymers having MFR (JIS K7210) falling in a range of 0.1 to 50 g/10 minutes, particularly 0.5 to 30 g/10 minutes can suitably be used.

Resins obtained by either of a radical polymerizing method and an ion polymerizing method can suitably be used for the polystyrene resin as long as they are obtained by publicly known methods. A number average molecular weight of the polystyrene resin can be selected from a range of preferably 5000 to 500000, more preferably 1000 to 200000, and the molecular weight distribution [a ratio (Mw/Mn) of a weight average molecular weight (Mw) to a number average molecular weight (Mn)] is preferably 5 or less.

This polystyrene resin includes, for example, polystyrene, styrene-butadiene block copolymers having a styrene unit content of 60% by weight or more, rubber-reinforced polystyrene, poly(α-methylstyrene) and poly(p-tert-butylstyrene), and they may be used alone or in combination of two or more kinds thereof. Further, copolymers obtained by polymerizing the mixtures of the monomers constituting these polymers can be used as well.

Further, the polyolefin resins and the polystyrene resins each described above can be used in combination. When these resins are added to the thermoplastic material according to the present invention, use of the polystyrene resin in combination tends to elevate a hardness of the resulting material as compared with the case where the polyolefin resin alone is added. Accordingly, selection of a blend proportion thereof makes it possible to control a hardness of the resulting thermoplastic material. In this case, a proportion of the polyolefin resin to the polystyrene resin is selected preferably from a range of 95/5 to 5/95 (weight ratio).

When these resin components are used in combination, they have to be used in a range where the effects of the present invention are not damaged, and a blend amount thereof is preferably 0 to 100 parts by weight per 100 parts by weight of the thermoplastic elastomer composition. In the case of, for example, the polyolefin resin, it is particularly preferably 0.1 to 50 parts by weight. If a blend amount of the resin component exceeds 100 parts by weight, a hardness of the resulting thermoplastic material becomes too high, and therefore it is not preferred.

Further, capable of being used, if necessary, in combination as the other additives are flame retardants; fungicides; hindered amine base light stabilizers; UV absorbers; antioxidants; colorants; various tackifiers such as silicon polymers, coumarone resins, coumarone-indene resins, phenolterpene resins, petroleum base hydrocarbons and rosin derivatives; various adhesive elastomers such as Leostomer B (brand name: manufactured by Riken Vinyl Co., Ltd.); and other thermoplastic elastomers or resins such as Hibler (brand name: a block copolymer in which polystyrene blocks are connected to both ends of a vinyl-polyisoprene block, manufactured by Kuraray Co., Ltd.) and Norex (brand name: polynorbornene obtained by subjecting norbornene to ring opening polymerization, manufactured by Nippon Zeon Co., Ltd.).

The silicon polymers described above have preferably a weight average molecular weight of 10,000 or more, preferably 100,000 or more. The silicon polymers described above improve a surface tackiness of a molded article using the composition. The above silicon polymers blended with general purpose thermoplastic polymers, for example, polyethylene, polypropylene and polystyrene in a high concentration can be used in order to improve a handling property thereof. In particular, the products blended with polypropylene have good processability and physical properties.

Those which are readily available as silicon concentrate BY27 series of a general purpose type commercially available from Toray Dow Corning Silicon Co., Ltd. may be used for such material.

A surface condition of the molded article can be improved by blending the silicon polymer, but a blending property of the silicon polymer with the copolymer comprising the vinyl aromatic compound block and the conjugate diene compound block is not necessarily good. This can readily be imagined from the fact that the respective polymers have notably different chemical compositions. Accordingly, the silicon polymer is likely to be separated depending on the composition of the blended matter and the molding conditions of the molded article. In this case, such situation can be improved by blending the copolymer comprising the vinyl aromatic compound block and the conjugate diene compound block with a polymer having a relatively good blending property, for example, a graft polymer obtained by chemically combining a polyolefin resin with a silicon polymer. Those which are commercially available from Toray Dow Corning Silicon Co., Ltd. as silicon concentrate BY27 series of a graft type may be used for such material.

A production process for the thermoplastic material according to the present invention shall not specifically be restricted, and publicly known processes can be applied. For example, it can readily be produced by melting and blending the respective components described above and the additive components used if necessary by means of a single shaft extruding machine, a double shaft extruding machine, a roll, a Banbury mixer, a blavender, a kneader or a high shearing type mixer and further adding a cross-linking agent such as organic peroxide and a cross-linking aid or mixing these required components at the same time and heating, melting and blending them.

Further, in the thermoplastic material according to the present invention, a cross-linking agent such as organic peroxide and a cross-linking aid can be added for cross-linking.

In this case, a cross-linking agent which can be added for partial cross-linking suitably includes organic peroxides, and to be specific, it includes, for example, 2,5-dimethyl-2, 5-di(t-butylperoxy)hexane; 2,5-dimethyl-2,5-di(benzoylperoxy)-hexane; t-butylperoxy benzoate; dicumyl peroxide; t-butylcumyl peroxide; diisopropyl benzohydroperxide; 1,3-bis-(t-butylperoxyisopropyl)-benzene; benzoyl peroxide; and 1,1-di(t-butylperoxy)-3,3,5-trimethylcyclohexane. Further, the useful cross-linking aid includes, for example, divinylbenzene, trimethylolpropane triacrylate, ethylene dimethacrylate, diallyl phthalate, quinone dioxime, phenylenebismaleimide, polyethylene glycol dimethacrylate and unsaturated silane compounds. These organic peroxides and crosslinking aids can optionally be used in a range of 0.1 to 5 parts by weight per 100 parts by weight of the whole blended materials to control the cross-linking degree. These organic peroxides and cross-linking aids can be used, if necessary, in combination of two or more kinds thereof respectively. When an unsaturated silane compound is used as the crosslinking aid, it can be brought into contact with moisture in the presence of a silanol condensation catalyst to allow cross-linking to proceed.

(B) Second Thermoplastic Elastomer Composition

The second thermoplastic elastomer composition constituting the elastic member of the present invention comprises (a) the hydrogenated block copolymer, (b) the softening agent for a non-aromatic rubber and (c) crystalline polyolefin as essential components to form a network structure.

The component (a) in the second thermoplastic elastomer composition is the same as the hydrogenated block copolymer constituting the component (a) in the first thermoplastic elastomer composition, and therefore the details thereof shall be omitted by quoting the descriptions given above.

The component (b) in the second thermoplastic elastomer composition is the softening agent for a non-aromatic rubber having a dynamic viscosity of 300 to 500 mm$^2$/sec at 40° C.,
and it is the same as the component (b) in the first-thermoplastic elastomer composition, except that it is blended in an amount of 60 to 170 parts by weight, preferably 70 to 150 parts by weight and more preferably 100 to 150 parts by weight per 100 parts by weight of the hydrogenated block copolymer of the component (a). In order to simplify description, the descriptions regarding the component (b) in the first thermoplastic elastomer composition shall be quoted for the other details of the component (b) in the second thermoplastic elastomer composition.

In the thermoplastic elastomer composition used for the elastic member, the crystalline polyolefin of the component (c) is blended in order to provide the durability against an ink. The crystalline polyolefin includes polyethylene, polypropylene, copolymers of polyethylene and acrylic acid and maleic anhydride-modified polypropylene, and polypropylene is preferred in the present invention.

A blend amount of the crystalline polyolefin of the component (c) is 5 to 30 parts by weight, preferably 5 to 20 parts by weight and more preferably 10 to 15 parts by weight per 100 parts by weight of the hydrogenated block copolymer of the component (a). If a blend amount of the crystalline polyolefin is less than 5 parts by weight, caused is the inconvenience that the extrusion moldability and the injection moldability are deteriorated. On the other hand, if it exceeds 30 parts by weight, caused is the inconvenience that the harness is increased and the flexibility is damaged.

The network structure in the second thermoplastic elastomer composition has a pore diameter of preferably 50 $\mu$m or less, more preferably 10 $\mu$m or less. If this pore diameter exceeds 50 $\mu$m, a part which is not reinforced by the network structure is likely to be present in the molded article, and the inconvenience that the stable product is not obtained is brought about.

The second thermoplastic elastomer composition can be blended, as is the case with the first thermoplastic elastomer composition, with a polyphenylene ether resin, scaly inorganic additives, particulate or powdery solid fillers, natural or artificial short fibers and long fibers, inorganic hollow fillers, organic hollow fillers and a foaming agent. Further, gas can mechanically be mixed in blending.

The second thermoplastic elastomer composition can be blended, as is the case with the first thermoplastic elastomer composition, with a resin component such as a polyolefin resin other than crystalline polyolefin and a polystyrene resin.

The second thermoplastic elastomer composition can be blended, if necessary, with flame retardants, fungicides, hindered amine base light stabilizers, UV absorbers, antioxidants, colorants, tackifiers, adhesive elastomers and other thermoplastic elastomers or resins as the other additives which are the same as in the first thermoplastic elastomer composition.

The second thermoplastic elastomer composition can be produced by, for example, the same process as the production process for the first thermoplastic elastomer composition. In order to form the network structure having a pore diameter of 50 $\mu$m or less, the composition is cooled down from a melting temperature to a room temperature preferably at a rate of 3° C./minute or more, more preferably 10° C./minute or more.

(C) Third Thermoplastic Elastomer Composition

The third thermoplastic elastomer composition constituting the elastic member of the present invention comprises (a) the hydrogenated block copolymer, (b) the softening agent for a non-aromatic rubber and (c) crystalline polyolefin, wherein a shear rate dependency of a melt viscosity measured by means of a capillograph is −1.5 to −0.8.

The component (a) in the third thermoplastic elastomer composition is the same as the hydrogenated block copolymer constituting the component (a) in the first and second thermoplastic elastomer compositions.

The component (b) in the third thermoplastic elastomer composition is the same as the softening agent for a non-aromatic rubber constituting the component (b) in the second thermoplastic elastomer composition, and it is blended in the same manner.

The crystalline polyolefin of the component (c) in the third thermoplastic elastomer composition includes polyethylene, polypropylene, copolymers of polyethylene and acrylic acid, maleic anhydride-modified polypropylene and polybutene, and polypropylene is preferred in the present invention.

A blend amount of the crystalline polyolefin of the component (c) is 5 to 30 parts by weight, preferably 10 to 20 parts by weight and more preferably 10 to 15 parts by weight per 100 parts by weight of the hydrogenated block copolymer of the component (a). If a blend amount of the crystalline polyolefin is less than 5 parts by weight, caused is the inconvenience that the extrusion moldability and the injection moldability are deteriorated. On the other hand, if it exceeds 30 parts by weight, the inconvenience that the harness is increased and the flexibility is lost is brought about.

The third thermoplastic elastomer composition can be blended, as is the case with the first and second thermoplastic elastomer compositions, with a polyphenylene ether resin, scaly inorganic additives, particulate or powdery solid fillers, natural or artificial short fibers and long fibers, inorganic hollow fillers, organic hollow fillers and a foaming agent. Further, gas can mechanically be mixed in blending. The details thereof are the same as described for the first thermoplastic elastomer composition.

The third thermoplastic elastomer composition can be blended, as is the case with the first and second thermoplastic elastomer compositions, with a resin component such as a polyolefin resin other than crystalline polyolefin and a polystyrene resin.

The third thermoplastic elastomer composition can be blended, if necessary, with flame retardants, fungicides, hindered amine base light stabilizers, UV absorbers, antioxidants, colorants, tackifiers, adhesive elastomers and other thermoplastic elastomers or resins as the other additives which are the same as in the first and second thermoplastic elastomer compositions.

A production process for the third thermoplastic elastomer composition shall not specifically be restricted, and the process described above as the production process for the first thermoplastic elastomer composition can be applied thereto.

In the third thermoplastic elastomer composition used in the present invention, a shear rate dependency of a melt viscosity measured by a capillograph is −1.5 to −0.8. This shear rate dependency means that a gradient of a straight line obtained by applying a common logarithm of an apparent melt viscosity $\eta_a$ measured by a capillograph (manufactured by Toyo Seiki Co., Ltd.) to an axis of abscissa and a common logarithm of an apparent shear rate to an axis of ordinate is −1.5 to −0.8 in the ranges of a temperature of 170 to 200° C. and $\eta_a$ of $10^1$ to $10^6$ sec$^{-1}$. In this case, a shear rate dependency of −0.8 or less shows that shear dependency is high. If this shear rate dependency exceeds −0.8, brought about is the problem that even if pressure is applied to a scarcely flowing part to such an extent that burr is not produced in injecting the composition by means of an injection molding machine, the composition can not be charged. If this shear rate dependency less than −1.5, brought about is the problem that a large influence is exerted on the moldability due to a change in pressure and that burr is liable to be produced. This shear rate dependency is preferably −1.2 to −0.9.

The elastic material of the present invention is constituted from the first, second and third respective thermoplastic elastomer compositions, and it is used for an ink tank having an ink room charged with an ink and an ink feeding part for feeding a recording head with the ink.

This elastic material can be used for any parts without specifically being restricted as long as they are parts requiring an elastic material. It is particularly preferably used, for example, as an ink tank valve which is disposed in a position separating an ink room from an ink feeding part and moves by a pressure difference between the above ink room and the ink-feeding part to feed a recording head part with an ink filled in the ink room or as a sealing member for an ink tank which is disposed in an ink feeding port of the ink tank and which prevents an ink from leaking from the above ink feeding port. Further, the elastic material of the present invention is used as an ink jet printer member and an ink tank member in an ink jet printer.

The following effects are provided by using the foregoing first, second and third thermoplastic elastomer compositions for these elastic materials.

The ink tank valve described above has usually a structure in which an elastic material is formed integrally on the surface of a plastic base material, and injection molding by a two-color molding method in which a step is simple and a production cost is low is advantageous when producing a molded article having such structure. Two-color molding with a plastic has been difficult in the case of a thermosetting rubber which has so far been used as the above elastic material, but use of the first, second and third respective thermoplastic elastomer compositions of the present invention makes two-color molding possible and makes it possible to produce an ink tank valve at a low cost.

Further, it has been difficult to mold a member having a desired shape from a material reduced in a hardness using a conventional thermosetting rubber and vulcanize it, but use of the first, second and third respective thermoplastic elastomer compositions of the present invention makes this possible and provides a molded article which has a suitable elasticity and is excellent in mechanical properties.

Further, in the third thermoplastic-elastomer composition used in the present invention, liquids having a very different polarity against an ink such as paraffin base oils can be used as an oil component used when reducing a hardness of the hydrogenated block copolymer of the component (a) such as SEBS and SEPS, and such oils are less liable to be compatible with a styrene block which is a coagulated domain in the hydrogenated block copolymer such as SEBS and SEPS and exert less effects on the physical properties of the hydrogenated block copolymer such as a strength. Further, use of the hydrogenated block copolymer such as SEBS and SEPS can provide an ink tank valve, a sealing member for an ink tank and a sealing member for preventing an ink from leaking from a recording head, which have less change in swelling caused by a solvent contained in an ink and which are excellent in durability.

The sealing member according to the present invention is disposed in an ink feeding port, and in addition thereto, it can be used as well for a connecting part which connects an ink feeding part with a recording head.

The present invention further provides the elastic member constituted from the thermoplastic elastomer composition described above, particularly preferably an ink tank using a sealing member for an ink tank valve and/or an ink tank.

The ink tank according to the present invention shall not specifically be restricted and may be any one as long as the above elastic member is used therefor, and it may be filled with a foamed matter such as polyurethane or may not be filled with such foamed matter.

A shape of the sealing member for the ink tank valve and the ink tank each described above shall not specifically be restricted and includes the same shapes as used for conventional ink tank. Conventionally known molding methods such as injection molding and extrusion molding can be adopted for a production method therefor in the case of, for example, the sealing member for an ink tank. On the other hand, in the case of the ink tank valve, a two-color molding method can be adopted, wherein a plastic which is a base material is molten and injection-molded into a die, and then the thermoplastic material according to the present invention is molten and injection-molded thereon to laminate the above thermoplastic material on the surface of the plastic molded article to integrate them. Or, an insert molding method can be adopted, wherein first, a plastic is molten and injection-molded into a die, and then the molded article is inserted into a different die; and the thermoplastic material according to the present invention is molten and injection-molded on the surface thereof to laminate the above thermoplastic material on the surface of the plastic molded article to integrate them.

Next, the present invention shall be explained in further details with reference to examples and comparative examples, but the present invention shall by no means be restricted by these examples.

The physical properties were evaluated by the following methods in Examples 1 to 7 and Comparative Examples 1 to 3.

(1) Hardness of Composition

Measured based on JIS K6253 (A type). The hardness is preferably 50 degrees or less, more preferably 15 to 45 degrees.

(2) Compression Set

Measured based on JIS K6262. The compression set is preferably 40% or less.

(3) Bleeding Amount of Softening Agent

The sample having a diameter of 25 mm and a thickness of 2 mm was put between iron plates and compressed so that a thickness of the sample became 1 mm, and it was left standing at 70° C. for 48 hours. Then, the weight of the sample was measured and deducted from the weight of the sample before compressed to obtain a value, and it was set as a bleeding amount of the softening agent and shown by weight percentage (%). If a bleeding amount of the softening agent is less than 3%, the product is marketable, and the high performance product has to have a bleeding amount of 1% or less.

(4) Printing Evaluation

The respective compositions were used to produce rubber sealing parts used for an ink discharge port of a commercially available ink tank, and these parts were disposed to an actual ink jet printer to carry out printing until an ink can not be discharged from the ink tank to confirm whether or not printed letters were missed.

A weight average molecular weight and a number average molecular weight of the copolymer were measured by means of gel permeation chromatography [GPC: GMH-XL (two columns connected in series), manufactured by Toso Co., Ltd.], wherein the differential refractive index (RJ) was used to calculate the values in terms of polystyrene based on monodispersed polystyrene as a standard.

$Mw/Mn$ of the oil was measured at a flow amount of 0.5 ml/minute, a column temperature of 40° C. and an RI temperature of 40° C. by means of an alliance as an analytical apparatus manufactured by Waters Co., Ltd., wherein two columns of Super H-H Column and Super HM-M Column were used for a separating column, and THF was used for a moving phase.

EXAMPLES 1 TO 7 AND COMPARATIVE EXAMPLES 1 TO 3

(1) Preparation of Thermoplastic Elastomer Compositions (Raw Material for Elastic Material for Ink Tank)

The respective components having compositions shown in Table 1 were sufficiently blended to prepare samples of thermoplastic elastomer compositions and evaluate the physical properties thereof.

As apparent from the results shown in Table 1, bleeding could scarcely be observed in the compositions prepared in Examples 1 to 7, but a large amount of bleeding was observed in the compositions prepared in Comparative Examples 1 to 3.

(2) Production of Ink Tank Valve

Next, the thermoplastic elastomer composition obtained in (1) described above was used to produce an ink tank valve on the production conditions of a die temperature of 80° C. and a resin temperature of 190° C., and this was installed in a position separating an ink room from an ink-feeding part in an ink tank.

(3) Production of Sealing Member for Ink Tank

Next, the thermoplastic elastomer composition obtained in (1) described above was used to produce a sealing member for the ink tank on the production conditions of a die temperature of 80° C. and a resin temperature of 170° C., and it was installed in an end part of an ink-feeding part.

TABLE 1-1

|  | Example | | | | |
| --- | --- | --- | --- | --- | --- |
|  | 1 | 2 | 3 | 4 | 5 |
| Blend rate (weight part) | | | | | |
| a-1 | 100 | — | — | — | — |
| a-2 | — | 100 | — | — | — |
| a-3 | — | — | 100 | — | — |

TABLE 1-1-continued

|  | Example | | | | |
|---|---|---|---|---|---|
|  | 1 | 2 | 3 | 4 | 5 |
| a-4 | — | — | — | 100 | — |
| a-5 | — | — | — | — | 100 |
| a-6 | — | — | — | — | — |
| b-1 | 150 | 150 | 150 | 150 | 100 |
| b-2 | — | — | — | — | — |
| b-3 | — | — | — | — | — |
| c-1 | 12.5 | 12.5 | 12.5 | 12.5 | 12.5 |
| Evaluation | | | | | |
| Hardness (JIS-A) (degree) | 20 | 20 | 20 | 20 | 25 |
| Compression set (%) | 25 | 35 | 35 | 35 | 35 |
| Softening agent bleeding (%) | 1 or less | 1 or less | 1 or less | 1 or less | 1 or less |
| Printing evaluation | No missing | No missing | No missing | No missing | No missing |

TABLE 1-2

|  | Example | | Comparative Example | | |
|---|---|---|---|---|---|
|  | 6 | 7 | 1 | 2 | 3 |
| Blend rate (weight part) | | | | | |
| a-1 | 100 | — | — | 100 | 100 |
| a-2 | — | 100 | — | — | — |
| a-3 | — | — | — | — | — |
| a-4 | — | — | — | — | — |
| a-5 | — | — | — | — | — |
| a-6 | — | — | 100 | — | — |
| b-1 | 70 | 70 | 150 | — | — |
| b-2 | — | — | — | 150 | — |
| b-3 | — | — | — | — | 150 |
| c-1 | 20 | 20 | 12.5 | 12.5 | 12.5 |
| Evaluation | | | | | |
| Hardness (JIS-A) (degree) | 45 | 45 | 20 | 20 | 20 |
| Compression set (%) | 35 | 40 | 45 | 25 | 35 |
| Softening agent bleeding (%) | 1 or less | 1 or less | 3 to 5 | 3 to 5 | 3 to 5 |
| Printing evaluation | No missing | No missing | Missing | Missing | Missing |

Explanations of Blended Components

Component (a)

a-1: Septon 4077 (SEPS having a weight average molecular weight of 350,000 and a styrene unit content of 30% by weight), manufactured by Kuraray Co., Ltd.

a-2: Septon 4055 (SEPS having a weight average molecular weight of 290,000 and a styrene unit content of 30% by weight), manufactured by Kuraray Co., Ltd.

a-3: Septon 8006 (SEPS having a weight average molecular weight of 290,000 and a styrene unit content of 30% by weight), manufactured by Kuraray Co., Ltd.

a-4: Crayton G (SEBS having a weight average molecular weight of 300,000 and a styrene unit content of 30% by weight), manufactured by Shell Chemical Co., Ltd.

a-5: Tufftech H1272 (SEBS having a weight average molecular weight of 250,000 and a styrene unit content of 30% by weight), manufactured by Asahi Chemicals Co., Ltd.

a-6: Tufftech H1041 (SEBS having a weight average molecular weight of 200,000 and a styrene unit content of 30% by weight), manufactured by Asahi Chemicals Co., Ltd.

Component (b)

b-1: Diana Process Oil PW380 (paraffin base oil having a dynamic viscosity of 380 mm$^2$/sec at 40° C., a weight average molecular weight of 750 and Mw/Mn of 1.15), manufactured by Idemitsu Kosan Co., Ltd.

b-2: Nisseki Polybutene HV-35 (polybutene having a dynamic viscosity of 330.0 mm$^2$/sec at 40° C., a weight average molecular weight of 750 and Mw/Mn of 1.94), manufactured by Nippon Petrochemical Co., Ltd.

b-3: Diana Process Oil PW32 (paraffin base oil having a dynamic viscosity of 30 mm$^2$/sec at 40° C., a weight average molecular weight of 404 and Mw/Mn of 1.3), manufactured by Idemitsu Kosan Co., Ltd.

Component (c)

c-1: PP-BC05B (non-modified polypropylene), manufactured by Nippon Polychem Co., Ltd.

The physical properties in the following Examples 8 to 12 and Comparative Examples 4 to 7 were evaluated by the following methods.

(1) Network Structure

Observed under SEM (scanning type electron microscope).

(2) Ink Resistance

The sample was dipped in an ink for a commercial ink jet printer at 70° C. to observe a change with the passage of time. The case where breakage was not observed at 70° C. for 3 days was ranked to A, and the case where breakage was caused was ranked to B.

A weight average molecular weight of the copolymer was measured by means of gel permeation chromatography [GPC: GMH-XL (two columns connected in series), manufactured by Toso Co., Ltd.], wherein the differential refractive index (RJ) was used to calculate the values in terms of polystyrene based on monodispersed polystyrene as a standard.

EXAMPLES 8 TO 12 AND COMPARATIVE EXAMPLES 4 TO 7

The respective components having compositions shown in Table 2 were sufficiently blended to prepare samples of thermoplastic elastomer compositions on the following cooling conditions and evaluate the physical properties thereof.

Cooling condition A: a cooling speed from a melting temperature in molding to removing a mold is faster than −70° C./minute.

Cooling condition B: a cooling speed from a melting temperature in molding to removing a mold is slower than −5° C./minute.

As apparent from the results shown in Table 2, a network structure was observed in the compositions prepared in Examples 8 to 12, and breakage was not caused in an ink, but breakage was caused in the ink in the compositions prepared in Comparative Examples 4 to 7, and it was found that the ink tank valves could not be used for a long period of time.

TABLE 2-1

|  | Example | | | | |
|---|---|---|---|---|---|
|  | 8 | 9 | 10 | 11 | 12 |
| Blend rate (weight part) | | | | | |
| a-1 | 100 | 100 | 100 | — | — |
| a-2 | — | — | — | 100 | 100 |
| b-1 | 150 | 70 | 100 | 150 | 150 |
| c-1 | 12.5 | 20 | 30 | 30 | 15 |
| Cooling condition Evaluation | A | A | A | A | A |
| Network structure | Present | Present | Present | Present | Present |
| Ink dipping evaluation | A | A | A | A | A |

TABLE 2-2

|  | Comparative Example | | | |
|---|---|---|---|---|
|  | 4 | 5 | 6 | 7 |
| Blend rate (weight part) | | | | |
| a-1 | 100 | — | 100 | — |
| a-2 | — | 100 | — | 100 |
| b-1 | 200 | 150 | 150 | 150 |
| c-1 | — | — | 12.5 | 15 |
| Cooling condition Evaluation | A | A | B | B |
| Network structure | None | None | None | None |
| Ink dipping evaluation | B | B | B | B |

Explanations of Blended Raw Materials

Raw Material (a)

a-1: Septon 4077 (SEPS having a weight average molecular weight of 350,000 and a styrene unit content of 30% by weight), manufactured by Kuraray Co., Ltd.

a-2: Septon 2002 (SEPS having a weight average molecular weight of 200,000 and a styrene unit content of 20% by weight), manufactured by Kuraray Co., Ltd.

Raw Material (b)

b-1: Diana Process Oil PW380 (paraffin base oil having a dynamic viscosity of 380 mm$^2$/sec at 40° C. and a weight average molecular weight of 750), manufactured by Idemitsu Kosan Co., Ltd.

Raw Material (c)

c-1: PP-BC05B (non-modified polypropylene), manufactured by Nippon Polychem Co., Ltd.

The physical properties in the following Examples 13 to 16 and Comparative Examples 8 to 11 were evaluated by the following methods.

(1) Shear Rate Dependency of Viscosity

Measured using a capillary having a length of 10 mm and a pore diameter of 1 mm by means of a capillograph (manufactured by Toyo Seiki Co., Ltd.).

(2) Moldability

Evaluated was the moldability observed when injection molding was carried out at a die temperature of 80° C. and a composition temperature of 170° C., wherein the case where filling was good and burr was not found was ranked to A; the case where a slight non-filled part was found was ranked to B; the case where a little burr was found was ranked to C; and the case where a non-filled part was found and large burr was produced was ranked to D.

A weight average molecular weight of the copolymer was measured by means of gel permeation chromatography [GPC: GMH-XL (two columns connected in series), manufactured by Toso Co., Ltd.], wherein the differential refractive index (RJ) was used to calculate the values in terms of polystyrene based on monodispersed polystyrene as a standard.

EXAMPLES 13 TO 16 AND COMPARATIVE EXAMPLES 8 TO 11

(1) Preparation of Thermoplastic Elastomer Compositions (Raw Material for Elastic Member for Ink Tank)

The respective components having compositions shown in Table 3 were sufficiently blended to prepare samples of thermoplastic elastomer compositions and evaluate the physical properties thereof.

(2) Production of Ink Tank Valve

Next, the thermoplastic elastomer composition obtained in (1) described above was used to produce an ink tank valve on the production conditions of a die temperature of 80° C. and a resin temperature of 190° C., and this was installed in a position separating an ink room from an ink feeding part in an ink tank.

(3) Production of Sealing Member for the Ink Tank Valve

Next, the thermoplastic elastomer composition obtained in (1) described above was used to produce a sealing member for an ink tank on the production conditions of a die temperature of 80° C. and a resin temperature of 170° C., and it was installed in an end part of an ink feeding part.

TABLE 3-1

|  | Example | | | Comparative Example | |
|---|---|---|---|---|---|
|  | 13 | 14 | 15 | 8 | 9 |
| Blend rate (weight part) | | | | | |
| a-1 | 100 | 100 | 100 | — | 100 |
| a-2 | — | — | — | 100 | — |
| b-1 | 70 | 150 | 150 | 150 | 150 |
| c-1 | 20 | 12.5 | — | 30 | 5 |
| c-2 | — | — | 12.5 | — | — |
| Evaluation | | | | | |
| Shear rate dependency | −0.8 | −1.0 | 1.5 | −0.6 | −1.7 |
| Moldability | A | A | A | B | C |

TABLE 3-2

|  | Comparative Example | |
|---|---|---|
|  | 10 | 11 |
| Blend rate (weight part) | | |
| a-1 | 100 | — |
| a-2 | — | 100 |
| b-1 | 300 | 150 |
| c-1 | 100 | 2 |
| c-2 | — | — |
| Evaluation | | |
| Shear rate dependency | −0.5 | −1.8 |
| Moldability | D | D |

Explanations of Blended Components

Component (a)

a-1: Septon 4077 (SEPS having a weight average molecular weight of 350,000 and a styrene unit content of 30% by weight), manufactured by Kuraray Co., Ltd.

a-2: Septon 4055 (SEPS having a weight average molecular weight of 290,000 and a styrene unit content of 30% by weight), manufactured by Kuraray Co., Ltd.

Component (b)

b-1: Diana Process Oil PW380 (paraffin base oil having a dynamic viscosity of 380 mm$^2$/sec at 40° C. and a weight average molecular weight of 750), manufactured by Idemitsu Kosan Co., Ltd.

Component (c)

c-1: PP-BC05B (non-modified polypropylene), manufactured by Nippon Polychem Co., Ltd.

c-2: Hizex (polyethylene), manufactured by Mitsui Petrochemical Co., Ltd.

INDUSTRIAL APPLICABILITY

The member for an ink jet recording apparatus according to the present invention has less bleeding into an ink tank and can stand use in the ink tank, and an ink jet recording apparatus using this member can print images having a high quality at a high precision. Further, it can be injection-molded by a two-color molding method with a plastic and can be molded from a material reduced in a hardness and vulcanized, and it has a good solvent resistance and is excellent in durability. It is suited as an ink tank valve which is disposed particularly in a position separating an ink room from an ink feeding part and which moves by virtue of a pressure difference between the above ink room and the ink feeding part to feed a recording head part with an ink filled in the ink room, a sealing member which is disposed in an ink feeding port and prevents an ink from leaking from the above ink feeding port and a sealing member which is disposed in an ink jet recording apparatus body and which prevents an ink from leaking from a recording head. Further, it can effectively be used as a sealing member for a connecting part for connecting an ink feeding part with a recording head.

What is claimed is:

1. An elastic member for an ink jet recording apparatus in which an ink is fed to record printed letters on a recording medium, characterized by being constituted from a thermoplastic elastomer composition comprising:

(a) 100 parts by weight of a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound, wherein a weight average molecular weight measured by gel permeation chromatography (GPC) is 200,000 or more, (b) 60 to 170 parts by weight of a softening agent for a non-aromatic rubber which has a dynamic viscosity of 350 to 400 mm2/sec at 40° C. and in which a ratio (Mw/Mn) of a weight average molecular weight to a number average molecular weight each measured by gel permeation chromatography (GPC) is 1.8 or less and (c) 5 to 30 parts by weight of polypropylene.

2. The elastic member for an ink jet recording apparatus as described in claim 1, wherein the thermoplastic elastomer composition has a compression set of 40% or less which is prescribed in JIS-K6262 and which is observed after compressing and deforming at a humidity of 25% and a temperature of 70° C. for 22 hours and then releasing and a hardness of 50 degrees or less which is prescribed in JIS-K6253 and which is measured by means of an A type durometer.

3. The elastic member for an ink jet recording apparatus as described in claim 1 or 2, used as an ink tank valve which is disposed in a position separating an ink room from an ink feeding part and which moves by virtue of a pressure difference between the above ink room and the ink feeding part to feed a recording head part with an ink filled in the ink room.

4. The elastic member for an ink jet recording apparatus as described in claim 1 or 2, used as a sealing member for an ink tank which is disposed in an ink feeding port in the ink tank and prevents an ink from leaking from the above ink feeding port.

5. The elastic member for an ink jet recording apparatus as described in claim 1 or 2, disposed in an ink jet recording apparatus body and used as a sealing member.

6. An ink tank comprising an ink room filed with an ink and an ink feeding part for feeding a recording head with the ink, characterized by using the elastic member as described in claim 1.

7. An ink jet recording apparatus, characterized by using the elastic member as described in claim 1.

8. The ink jet recording apparatus as described in claim 7, having a performance of 360 dpi×360 dpi (dot/inch) or more.

9. The ink jet recording apparatus as described in claim 7 or 8, using a color ink having 5 or more colors.

10. An elastic member for an ink jet recording apparatus in which an ink is fed to record printed letters on a recording medium, characterized by being constituted from a thermoplastic elastomer composition in which a network structure having a pore diameter of 50 μm or less is formed, comprising:
   (a) 100 parts by weight of a hydrogenated block copolymer obtained by hydrogenating a block copolymer which comprises three polymer blocks, in which polymer blocks at both ends out of the above three polymer blocks are polymers block comprising principally a vinyl aromatic compound and in which a polymer block present between the polymer blocks at the above both ends is a polymer block comprising principally a conjugate diene compound, wherein a weight average molecular weight measured by gel permeation chromatography (GPC) is 200,000 or more,
   (b) 60 to 170 parts by weight of a softening agent for a non-aromatic rubber having a dynamic viscosity of 300 to 500 mm2/sec at 40° C. and
   (c) 5 to 30 parts by weight of crystalline polyolefin.

11. The elastic member for an ink jet recording apparatus as described in claim 10, wherein the polymer blocks at both ends in the component (a) comprise polystyrene, and the crystalline polyolefin in the component (c) comprises polypropylene.

12. The elastic member for an ink jet recording apparatus as described in claim 10 or 11, used as an ink tank valve which is disposed in a position separating an ink room from an ink feeding part and which moves by virtue of a pressure difference between the above ink room and the ink feeding part to feed a recording head part with an ink filled in the ink room.

13. The elastic member for an ink jet recording apparatus as described in claim 10 or 11, used as a sealing member for an ink tank which is disposed in an ink feeding port in the ink tank and prevents an ink from leaking from the above ink feeding port.

14. The elastic member for an ink jet recording apparatus as described in claim 10 or 11, disposed in an ink jet recording apparatus body and used as a sealing member.

15. An ink tank comprising an ink room filled with an ink and an ink feeding part for feeding a recording head with the ink, characterized by using the elastic member as described in claim 10.

16. An ink jet recording apparatus, characterized by using the elastic member as described in claim 10.

17. The ink jet recording apparatus as described in claim 16, having a performance of 360 dpi×360 dpi (dot/inch) or more.

18. The ink jet recording apparatus as described in claim 16 or 17, using a color ink having 5 or more colors.

19. An elastic member used for an ink jet recording apparatus in which an ink is fed to record printed letters on a recording medium, characterized by being constituted from a thermoplastic elastomer composition in which a shear rate dependency of a melt viscosity measured by means of a capillograph is −1.5 to −0.8, comprising:
   (a) 100 parts by weight of a hydrogenated block copolymer obtained by hydrogenating a block copolymer which comprises three polymer blocks, in which polymer blocks at both ends out of the above three polymer blocks are polymer blocks comprising principally a vinyl aromatic compound and in which a polymer block present between the polymer blocks at the above both ends is a polymer block comprising principally a conjugate diene compound, wherein a weight average molecular weight measured by gel permeation chromatography (GPC) is 200,000 or more,
   (b) 60 to 170 parts by weight of a softening agent for a non-aromatic rubber having a dynamic viscosity of 300 to 500 mm2/sec at 40° C. and
   (c) 5 to 30 parts by weight of crystalline polyolefin.

20. The elastic member for an ink jet recording apparatus as described in claim 19, wherein the polymer blocks at both ends in the component (a) comprise polystyrene, and the crystalline polyolefin in the component (c) comprises polypropylene.

21. The elastic member for an ink jet recording apparatus as described in claim 19 or 20, used as an ink tank valve which is disposed in a position separating an ink room from an ink feeding part and which moves by virtue of a pressure difference between the above ink room and the ink feeding part to feed a recording head part with an ink filled in the ink room.

22. The elastic member for an ink jet recording apparatus as described in claim 19 or 20, used as a sealing member for an ink tank which is disposed in an ink feeding port in the ink tank and prevents an ink from leaking from the above ink feeding port.

23. The elastic member for an ink jet recording apparatus as described in claim 19 or 20, disposed in an ink jet recording apparatus body and used as a sealing member.

24. An ink tank comprising an ink room filled with an ink and an ink feeding part for feeding a recording head with the ink, characterized by using the elastic member as described in claim 19.

25. An ink jet recording apparatus, characterized by using the elastic member as described in claim 19.

26. The ink jet recording apparatus as described in claim 25, having a performance of 360 dpi×360 dpi (dot/inch) or more.

27. The ink jet recording apparatus as described in claim 25 or 26, using a color ink having 5 or more colors.

* * * * *